Nov. 7, 1950 A. M. ROOT, JR 2,528,975
APPARATUS FOR MELTING RUBBERIZED
BITUMINOUS COMPOSITIONS
Filed Sept. 9, 1947 4 Sheets—Sheet 2

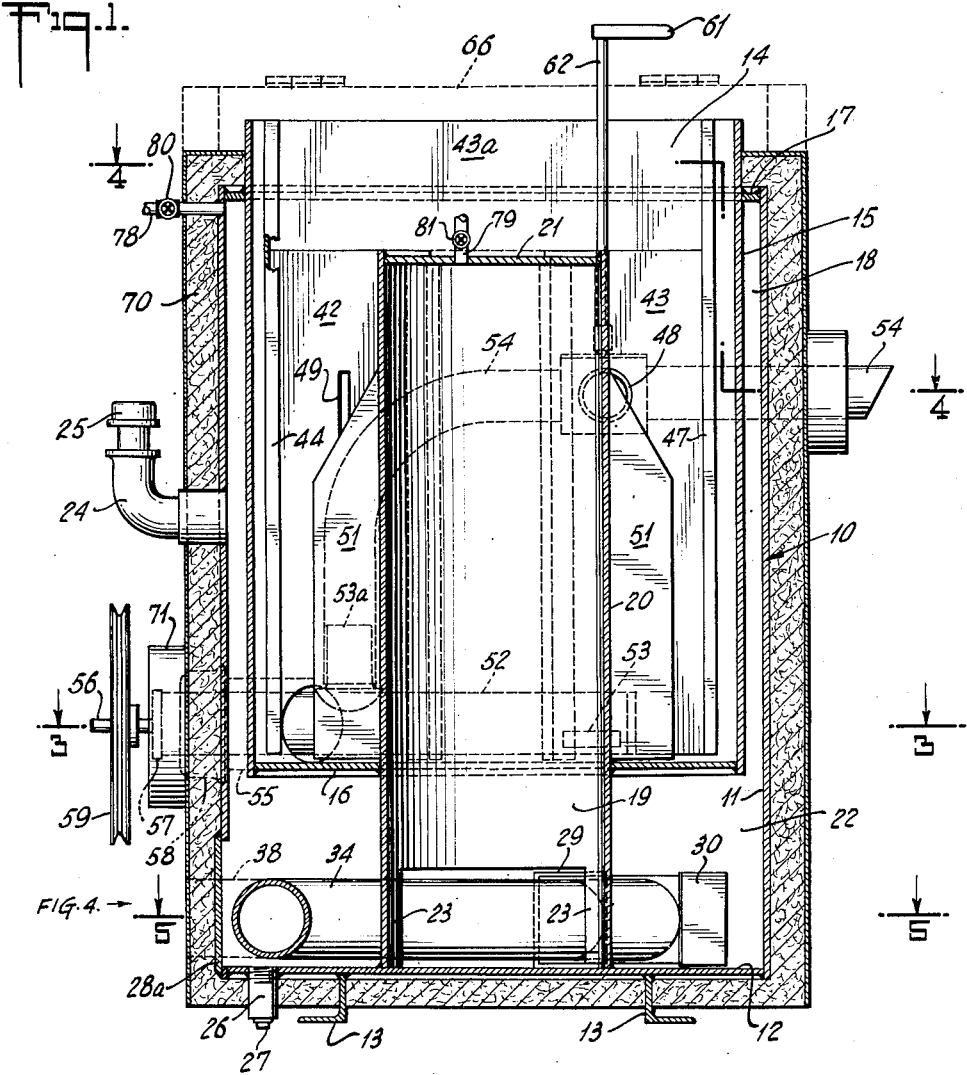

INVENTOR
ARTHUR M. ROOT JR.
BY
Samuel Stearman
ATTORNEY

Nov. 7, 1950

A. M. ROOT, JR 2,528,975

APPARATUS FOR MELTING RUBBERIZED
BITUMINOUS COMPOSITIONS

Filed Sept. 9, 1947

INVENTOR
ARTHUR M. ROOT JR.
BY
Samuel Steamman
ATTORNEY

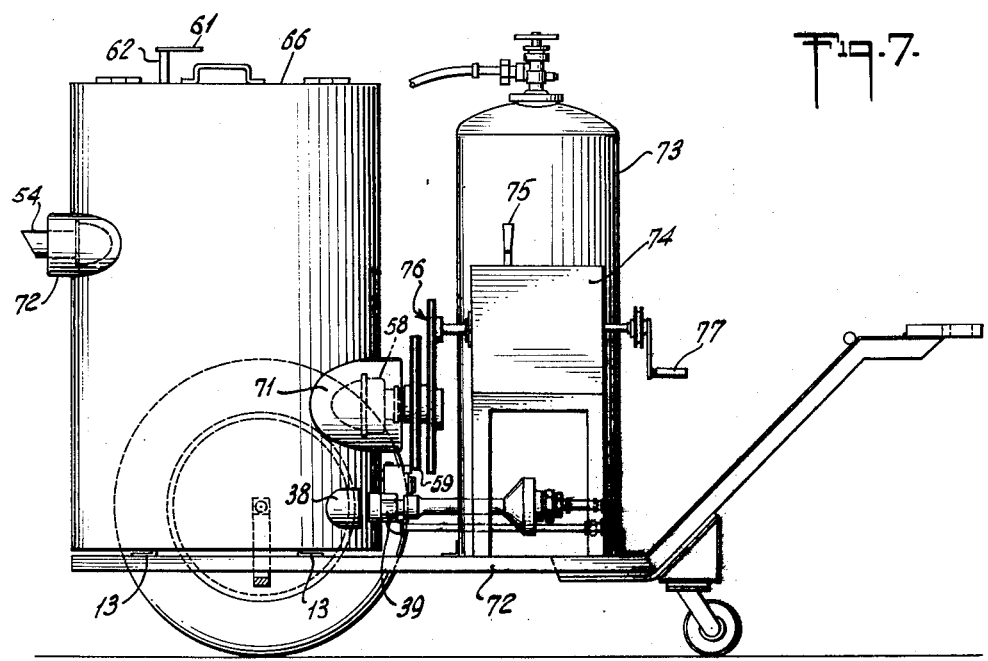
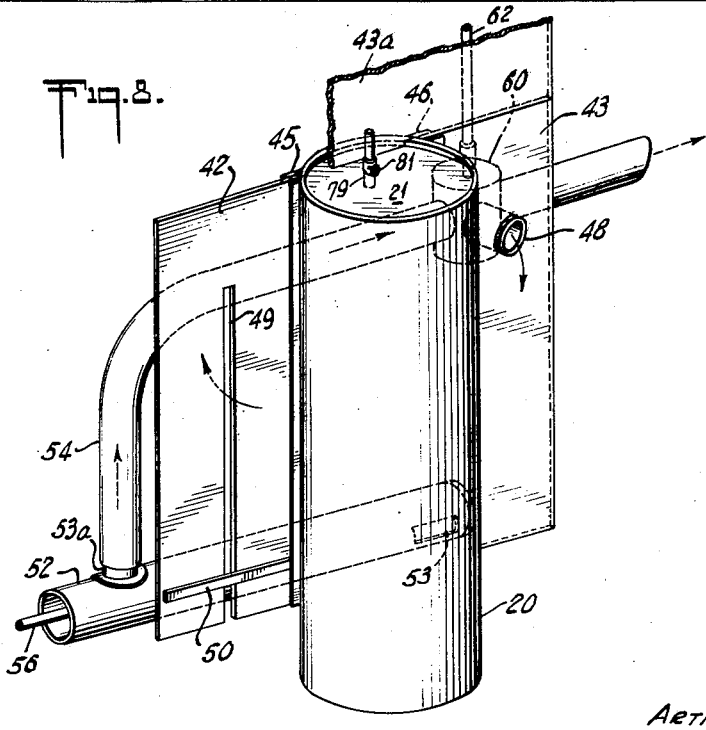

Patented Nov. 7, 1950

2,528,975

UNITED STATES PATENT OFFICE 2,528,975

APPARATUS FOR MELTING RUBBERIZED BITUMINOUS COMPOSITIONS

Arthur M. Root, Jr., Rutherford, N. J., assignor to The Patent and Licensing Corporation, New York, N. Y., a corporation of Massachusetts Application September 9, 1947, Serial No. 772,961

6 Claims. (Cl. 126—343.5)

This invention relates to a heating device for heating and melting normally solid thermoplastic materials. Although not necessarily confined thereto, the invention is particularly concerned with a device for heating rubberized bituminous compounds, particularly of the types employed for sealing the joints in concrete.

In the construction of concrete runways of airports and concrete highways, the joints between concrete sections are provided with filler strips serving as expansion and contraction joints, and a sealing compound is applied over the filler strip in order that the joint shall be effectively sealed against infiltration of moisture. For that purpose, it is necessary that the joint sealing compound be resilient and sufficiently adhesive with respect to the concrete so that there will be no failure of the bond between the sealer and the concrete during cycles of expansion and contraction under the atmospheric conditions encountered in service. The compounds that have been developed for that purpose accordingly comprise mixtures of bituminous materials and rubber, the rubber constituting generally about 20 to 30% by weight of the compound, and being blended with the bitumen while the latter is maintained in a fluid molten condition. These compounds are relatively solid at normal atmospheric temperatures and hence must be heated to relatively high temperatures of the order of 450 to 500° F., to bring them to a state of fluidity such as to enable them to be poured into the joints properly. Usually the pour point, i. e., the temperature at which the material will pour readily and uniformly, is from 410 to 420° F. However, if in heating a batch of the material to reduce it to pourable consistency, any portion of it is permitted to exceed a temperature of about 450° F., the entire batch may be rendered unfit for use.

Because of the nature of these compounds, and owing particularly to the rubbery character thereof, it is exceedingly difficult to reduce them to a suitable pouring consistency without, at the same time, injuriously affecting the physical properties which the compound must posesss in order to meet service requirements. Further, in the construction of concrete highways and airport runways where relatively long distances are involved, it is desirable to have, for melting these rubberized bituminous compounds, a heating device which will provide an adequate supply of molten sealing composition and which will at the same time be small enough and light enough to permit it to be easily and readily moved from place to place by hand. The known types of heating kettles and similar heating devices are unsatisfactory for melting these compounds in commercial scale operations either because they do not heat the compounds uniformly and the material is adversely affected as a result of local overheating or because, when held within practical size and weight limits, they are incapable of melting this type of compound at an adequate rate of out-put, or because they involve structures or mechanisms which render them costly and cumbersome to employ for this purpose.

The principal object of the invention is to provide a compact heating device adapted to be readily transported which will be suitable for heating and melting rubberized bituminous compositions of the character referred to at a rate which is adequate for practical use in the field application of this type of material and which will be capable of melting the compounds to pouring consistency without danger of injury to the physical properties thereof.

In accordance with the invention, there is provided a heating apparatus in which melting of rubberized bituminous compositions is effected by means of heat transferred indirectly by the vapors of a liquid material which is vaporizable at relatively low pressures to provide vapors at relatively high temperatures. A suitable material for the purpose of the invention is the liquid heat transfer medium well known as "Dowtherm A," which comprises a mixture of 73.5% diphenyloxide and 26.5% diphenyl. This mixture boils at 500° F. at atmospheric pressure and is characterized by a high heat transfer coefficient as well as by the definite temperatures at which the vapors may be maintained.

A feature of the invention resides in the arrangement by which the heat contained in the vapor is transferred to the material to be melted. In the apparatus of the invention the compositions to be melted are contained in a relatively narrow chamber, the walls and bottom of which are maintained at a definite temperature by the vapors of the liquid heat transfer medium whereby an even heat is rapidly transferred to the contents of the chamber. This arrangement with its resultant high heat transfer rate makes it possible to melt rubberized bituminous compositions of the character described at a rate corresponding to one-third the cubic capacity of the melting chamber per hour of operation. Thus, a heating apparatus constructed according to my invention and having a cubic capacity of approximately 30 gallons will be capable of melting rubberized bituminous compositions at a rate of at least 10 gallons per hour.

Another feature of the invention resides in the construction of the heating chamber to provide a section for receiving only substantially completely melted material and to provide means for circulating material from this section through the remainder of the heating chamber whereby the material travels the length of the heating chamber before returning to the first-named section.

Other objects and advantages of the invention will be apparent from the more detailed description, which follows:

In the accompanying drawings:

Fig. 1 is a vertical section of a heating device embodying the invention, taken along line 1—1 of Fig. 4;

Fig. 2 is a fragmentary view, in elevation, of the lower portion of the apparatus;

Fig. 7 is a side elevation of the heating device showing it mounted upon a movable carriage; and Fig. 8 is a perspective view of a portion of the interior of the heating device showing the discharge assembly.

Figure 3:
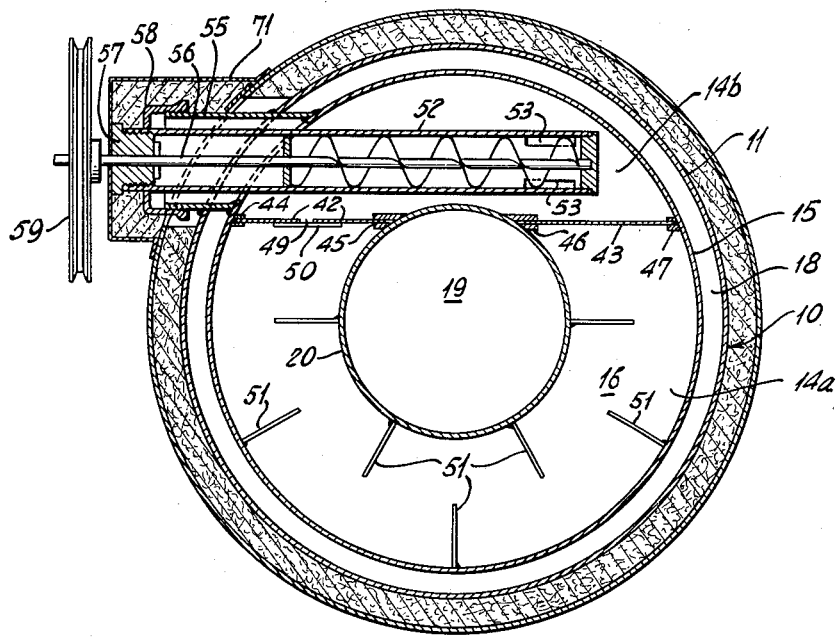
Fig. 3 is a horizontal section taken along the line 3—3 of Fig. 1.
Figure 4:
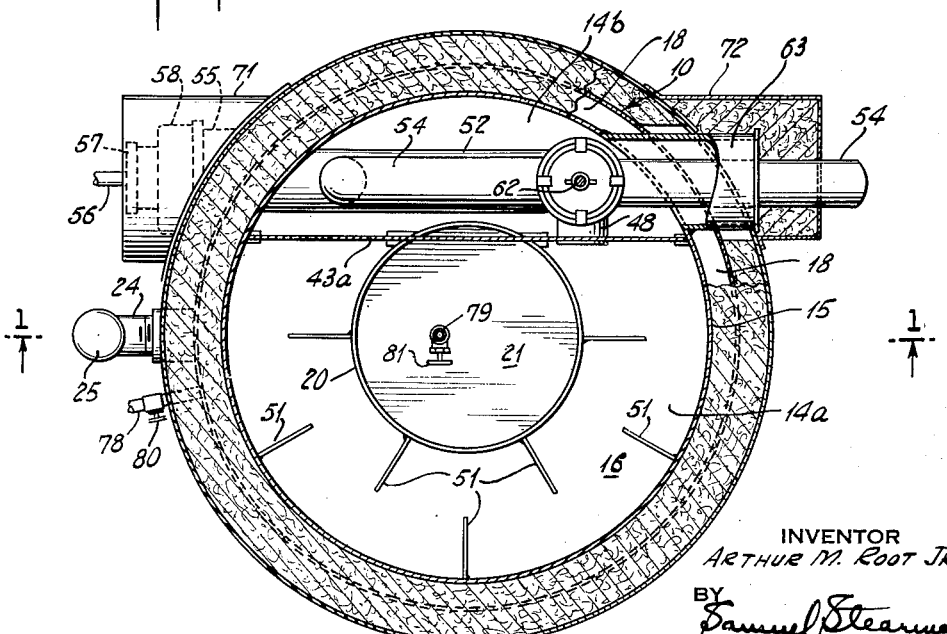
Fig. 4 is a horizontal section taken along the line 4—4 of Fig. 1.
Figure 5:
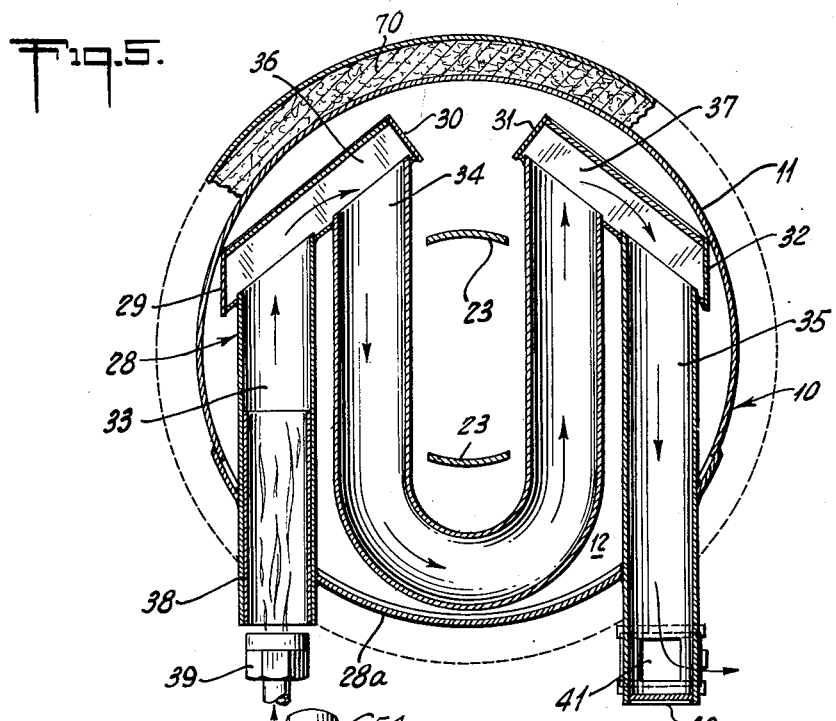
Fig. 5 is a horizontal section taken along the line 5—5 of Fig. 1.
Figure 6:
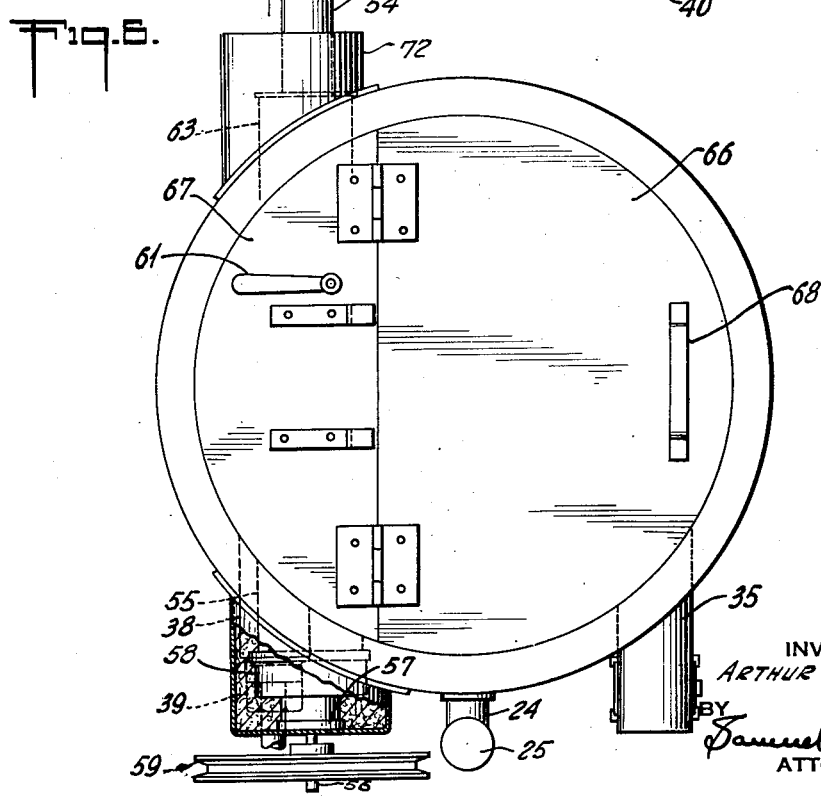
Fig. 6 is a top plan view of the apparatus.

Referring to the drawings, the numeral 10 refers generally to a cylindrical tank comprising side wall 11 and bottom 12 secured to the side wall 11 as by welding and supported as by angle irons 13. Extending into tank 10 is a cylindrical chamber 14 for holding the material to be melted. This chamber comprises a side wall 15 and bottom 16. A collar 17 secured to the outer surface of wall 15 and the inner surface of wall 11 seals the annular vapor space 18 therebetween and a jacket is thereby provided for wall 15. A cylindrical vapor chamber 19 is formed by wall 20 extending upwardly from bottom 12 through bottom 16 into chamber 14. A top 21 is welded to the inside of wall 20 at its upper end. Cylindrical wall 20 forms with wall 11 an annular space 22 communicating with vapor space 18. Wall 20 does not extend in its entirety to the bottom 12 but rather, as shown in Figs. 1 and 2, is cut away to the extent that only leg portions 23 are secured to the bottom 12. This arrangement permits ready insertion and withdrawal of the heating flue hereinafter described, and also provides means for the liquid heat transfer medium, which is maintained in annular space 22, to enter vapor space 19.

An inlet pipe 24 normally closed by threaded cap 25 is connected to wall 11 for charging desired quantities of liquid heat transfer medium into annular space 22 and an outlet pipe 26 having a threaded plug 27 may be connected to bottom 12 to permit draining the liquid from the lower section of the tank 10.

The liquid heat transfer medium in the tank is heated and vaporized by means of a suitable heating unit submerged in the liquid. This unit preferably comprises a flue assembly through which hot combustion gases from a gas or oil burner may be circulated. The flue assembly, indicated generally by the numeral 28, is carried by curved plate 28a and supported on the bottom 12 by plates 29, 30, 31 and 32. As shown, the flue assembly comprises tubular flues 33, 34 and 35 and end flues 36 and 37, the end flues serving to join flue 33 to flue 34 and flue 35 to flue 34, respectively. End flues 36 and 37 are boxlike in shape and are formed from rectangular plates, including end plates 29, 30, 31 and 32. A sleeve 38 is provided in flue 33 to protect it from the direct flame emitted from burner 39. The end of flue 35 which extends outside tank 10 is sealed by circular plate 40 and an opening 41 is provided in the underside of flue 35 to permit the exit of the combustion gases. Flues 33 and 35 are secured by welding to plate 28a. The flue assembly is inserted in tank 10 through a suitable opening in wall 11 adjacent bottom 12, the plate 28a being concentric with wall 11 and of sufficient size to overlap the marginal edges of the opening in the wall. After the flue assembly is inserted, plate 28a is secured, as by welding or bolting, to wall 11 and the opening is thereby sealed.

The annular space between walls 15 and 20 is divided into two sections 14a and 14b by vertical partitions 42 and 43. Partition 42 which extends to the top of wall 20 is held in place in the channels formed by sets of vertical strips 44 and 45 secured to walls 15 and 20, respectively, and partition 43 equal in height to partition 42 is similarly held by strips 46 and 47 secured to walls 20 and 15, respectively. Partition 43a which extends across chamber 14 from the top of partitions 42 and 43 to the top of wall 15 is secured by vertical strips 44 and 47 and is vertically movable. Preferably the partitions divide the chamber 14 into two sections of unequal size, the larger section 14a containing the major portion of wall 20. Partitions 42 and 43 are vertically movable but when in place extend to the bottom 16 of chamber 14. Partition 43 is preferably solid, except for an opening to admit recirculation pipe 48 hereinafter described. Partition 42 is provided with a vertical slot 49 to permit passage of melted material from section 14a to section 14b. Reinforcing bar 50 is welded to partition 42. It will be obvious that additional slots may be provided in partition 42 or that slot 49 may be replaced by a plurality of perforations, i. e., partition 42 may be foraminated. Slot 49 should not exceed ¾" in width and preferably should be about ½" in width to insure that only substantially completely melted material will pass into chamber section 14b.

Vertical fins or baffles 51 are secured to the outer side of wall 20 and the inner side of wall 15 and extend into chamber section 14a. Preferably, the fins are in staggered relationship in order that molten material flowing from partition 43 and around chamber section 14a will be forced to take a tortuous path. Preferably the fins extend almost but not completely to the bottom 16 in order that flow of material through the finned region will not be unnecessarily impeded.

A positive pressure pumping assembly is provided for discharging the molten material and/or recirculating it through chamber section 14a which is adapted to hold the solid and partially melted material. In the apparatus shown, this pumping assembly comprises a screw pump 52 located adjacent the bottom 16 in chamber section 14b where the molten material accumulates. The inlet of the pump is provided by openings indicated at 53 and the outlet 53a is connected to a bent discharge pipe 54. A tubular duct 55 extends through aligned openings in walls 11 and 15, and the pump casing extends through this duct exteriorly of tank 10. The pump shaft 56 passes through stuffing box 57 secured to tubular duct 55 by threaded head 58. A pulley 59 is fastened to the pump shaft for driving the pump.

The discharge pipe 54 is fitted with a valve 60 in order that part or all of the material being pumped through pipe 54 may be diverted into pipe 48 which discharges into chamber section 14a. By such diversion the molten material being pumped out of chamber section 14b may be circulated back to chamber section 14a which contains the unmelted or partially melted material, and the melting process may be thereby expedited. Valve 60 may be operated manually by means of handle 61 attached to valve stem 62. Discharge pipe 54 passes to the outside of tank 10 through tubular duct 63. Tubular ducts 55 and 63 are welded to walls 11 and 15 and are provided to permit ready withdrawal of the pumping and discharge assembly for cleaning and repair.

The top of the tank is provided with a movable cover 66 hinged to a fixed cover 67. The movable cover which may be raised by handle 68 permits access to the finned chamber section 14a to permit charging the chamber with material to be melted.

To avoid unnecessary loss of heat to the atmosphere, insulation 70 may be applied to the outer surfaces of tank 10 and covers 66 and 67. Insulation may also be enclosed within a housing 71 for the pump and in housing 72 for tubular duct 63 and outlet pipe 54.

The above described heating apparatus of the invention is adapted to be suitably mounted upon a portable truck 72 as shown in Fig. 7 for conveniently transporting it from place to place. A fuel tank 73 may also be mounted upon the truck, for supplying fuel to burner 39. A power unit 74, conveniently a one cylinder gasoline engine, may be provided for operating pump 52. Operation of the pump is controlled by means of clutch lever 75, power being transmitted to the pump through pulley 76 driving pulley 59. The pump may also be operated manually by means of crank 77 when the compression in the engine is released.

It will be understood that a thermostatically controlled valve (not shown) for regulating the flow of fuel to the burner 39 may be provided for controlling the temperature of the vapor within the desired limits. Suitable pressure relief mechanism (not shown) may be connected to the vapor space 18. In heating the Dowtherm A to vaporization temperature, it is desirable to vent the vapor space 18 and vapor space 19 as through vents 78 and 79 controlled by valves 80 and 81 respectively, to free the vapor spaces of any air they may contain.

In using the device for melting rubberized bituminous compositions of the character previously described, pieces of the rubberized bituminous composition weighing say 10 to 20 pounds each are charged into section 14a of the melting chamber, and the liquid heat-transfer medium "Dowtherm" in the chamber 22 is heated and vaporized by the submerged heating flue assembly 28, the temperature developed being dependent upon the pressure in the vapor chambers. The vapor of "Dowtherm A" (73.5% diphenyloxide and 26.5% diphenyl) has a temperature of 450° F. at a pressure of 7.8 pounds per square inch (absolute) corresponding to a vacuum of 14 inches of mercury, a temperature of 500° F. at a pressure of 15 pounds per square inch (absolute) or zero gage pressure, and a temperature of 520° F. at a pressure of 19 pounds per square inch (absolute) or 4 pounds gage pressure.

As the pieces of rubberized bituminous composition become substantially melted by the action of the heat transferred through wall 15, bottom 16 and wall 20 (and fins 51) additional pieces of the composition may be charged to the chamber. As the composition melts it passes through the slot 49 in partition 42 into chamber section 14b. As the melting proceeds it is desirable to set pump 52 in operation and by adjusting valve 60 direct the material passing through pipe 54 into chamber section 14a. The molten material falling upon the still solid pieces of the composition in this chamber section assists the melting process and promotes uniformity of the molten product. It will be noted that as the molten material is discharged at 48 into chamber section 14a it falls adjacent partition 43 and in order to return through slot 49 it must travel throughout the length of chamber section 14a past each of the fins 51, thereby aiding the melting process. By virtue of the high heat transfer coefficient of the vapors in the vapor spaces 18 and 19 and the proximity of the bulk of the material to a hot surface at all times, uniform and rapid melting of the composition is effected without, however, at any time exposing the composition to the danger of overheating.

When a sufficient level of molten material has accumulated in chamber section 14b, the valve 60 may be adjusted to permit the material to be pumped through the entire length of discharge pipe 54 to the outside of the apparatus where the material may be collected in buckets or other portable containers.

I claim:

1. Apparatus for melting rubberized bituminous compositions by indirect heating means, which comprises a tank for holding the material, a jacket on the wall of the tank, means forming a chamber beneath the bottom of the tank adapted to contain a liquid heat transfer medium vaporizable at low pressures to provide vapor at temperatures of from 450 to 520° F., said chamber communicating with the jacket, heating means extending into the chamber for vaporizing the liquid heat transfer medium, a hollow member having an open end in communication with the chamber and a closed end extending upwardly into the tank in spaced relationship to the inner walls of the tank, and a positive pressure discharge assembly mounted in said tank adjacent the bottom thereof.

2. Apparatus for melting rubberized bituminous compositions by indirect heating means, which comprises a tank for holding the material, a jacket on the wall of the tank, means forming a chamber beneath the bottom of the tank adapted to contain a liquid heat transfer medium vaporizable at low pressures to provide vapor at temperatures of from 450 to 520° F., said chamber communicating with the jacket, heating means extending into the chamber for vaporizing the liquid heat transfer medium, a hollow member having an open end in communication with the chamber and a closed end extending upwardly into the tank in spaced relationship to the inner walls of the tank, a vertical partition dividing the tank into a charging chamber adapted to receive the material to be melted and an accumulating chamber adapted to receive only the substantially melted material, said partition being provided with means to permit the passage of only substantially melted material from the charging chamber to the accumulating chamber, and spaced vertical fins extending into said charging chamber alternately from the wall of the tank and from the wall of the upwardly extending hollow chamber.

3. Apparatus for melting rubberized bituminous compositions by indirect heating means, which comprises a tank for holding the material, a jacket on the wall of the tank, means forming a chamber beneath the bottom of the tank adapted to contain a liquid heat transfer medium vaporizable at low pressures to provide vapor at temperatures of from 450 to 520° F., said chamber communicating with the jacket, heating means extending into the chamber for vaporizing the liquid heat transfer medium, a hollow member having an open end in communication with the chamber and a closed end extending upwardly into the tank in spaced relationship to the inner walls of the tank, a vertical partition dividing the tank into a charging chamber adapted to receive the material to be melted and an accumulating chamber adapted to receive only the substantially melted material, said partition being provided with means to permit the passage of only substantially melted material from the charging chamber to the accumulating chamber, and a positive pressure discharge assembly mounted adjacent the bottom of the accumulating chamber.

4. Apparatus for melting rubberized bituminous compositions by indirect heating means, which comprises a tank for holding the material, a jacket on the wall of the tank, means forming a chamber beneath the bottom of the tank adapted to contain a liquid heat transfer medium vaporizable at low pressures to provide vapor at temperatures of from 450 to 520° F., said chamber communicating with the jacket, heating means extending into the chamber for vaporizing the liquid heat transfer medium, a hollow member having an open end in communication with the chamber and a closed end extending upwardly into the tank in spaced relationship to the inner walls of the tank, a vertical partition dividing the tank into a charging chamber adapted to receive the material to be melted and an accumulating chamber adapted to receive only the substantially melted material, said charging chamber having a volume greater than that of the said accumulating chamber, and said partition being provided with means to permit the passage of only substantially melted material from the charging chamber to the accumulating chamber, a positive pressure discharge assembly mounted adjacent the bottom of the accumulating chamber, and means for intermittently recirculating molten material from said accumulating chamber back to said charging chamber.

5. Apparatus for melting rubberized bituminous compositions by indirect heating means, which comprises a tank for holding the material, a jacket on the wall of the tank, means forming a chamber beneath the bottom of the tank adapted to contain a liquid heat transfer medium vaporizable at low pressures to provide vapor at temperatures of from 450 to 520° F., said chamber communicating with the jacket, heating means extending into the chamber for vaporizing the liquid heat transfer medium, a hollow member having an open end in communication with the chamber and a closed end extending upwardly into the tank in spaced relationship to the inner walls of the tank, and a vertical partition dividing the tank into a charging chamber adapted to receive the material to be melted and an accumulating chamber adapted to receive only the substantially melted material, said charging chamber having a volume greater than that of the said accumulating chamber, said partition being intercepted by the upwardly extending hollow member, the portion of said partition extending at one side of said hollow member being provided with means to permit the passage of substantially melted material from the charging chamber to the accumulating chamber, a positive pressure discharge assembly mounted adjacent the bottom of the accumulating chamber, and means for intermittently recirculating molten material from said accumulating chamber back to said charging chamber.

6. Apparatus for melting rubberized bituminous compositions by indirect heating means, which comprises a tank for holding the material, a jacket on the wall of the tank, means forming a chamber beneath the bottom of the tank adapted to contain a liquid heat transfer medium vaporizable at low pressures to provide vapor at temperatures of from 450° to 520° F., said chamber communicating with the jacket, heating means extending into the chamber for vaporizing the liquid heat transfer medium, a hollow member having an open end in communication with the chamber and a closed end extending upwardly into the tank in spaced relationship to the inner walls of the tank, and spaced vertical fins extending into said tank alternately from the wall thereof and from the wall of the upwardly extending hollow member.

ARTHUR M. ROOT, Jr.

REFERENCES CITED

The following references are of record in the file of this patent:

UNITED STATES PATENTS

| Number | Name | Date |
| --- | --- | --- |
| 331,446 | Richmond | Dec. 1, 1885 |
| 382,595 | Egerton | May 8, 1888 |
| 470,562 | Grodhaus | Mar. 8, 1892 |
| 500,612 | Read et al. | July 4, 1893 |
| 1,197,745 | Kinney | Sept. 12, 1916 |
| 1,466,637 | Babb | Aug. 28, 1923 |
| 1,527,771 | Baer et al. | Feb. 24, 1925 |
| 1,541,849 | Reynolds | June 16, 1925 |
| 2,076,689 | Williams | Apr. 13, 1937 |
| 2,360,665 | Fields | Oct. 17, 1944 |
| 2,429,916 | Belgau | Oct. 28, 1947 |
| 2,439,367 | Middlestadt | Apr. 6, 1948 |

FOREIGN PATENTS

| Number | Country | Date |
| --- | --- | --- |
| 645,536 | France | June 27, 1928 |
| 700,805 | France | Jan. 2, 1931 |